July 25, 1961 E. A. BENDER 2,993,570
PORTABLE TRAILER-MOUNTED DERRICK
Filed April 18, 1955 7 Sheets-Sheet 2
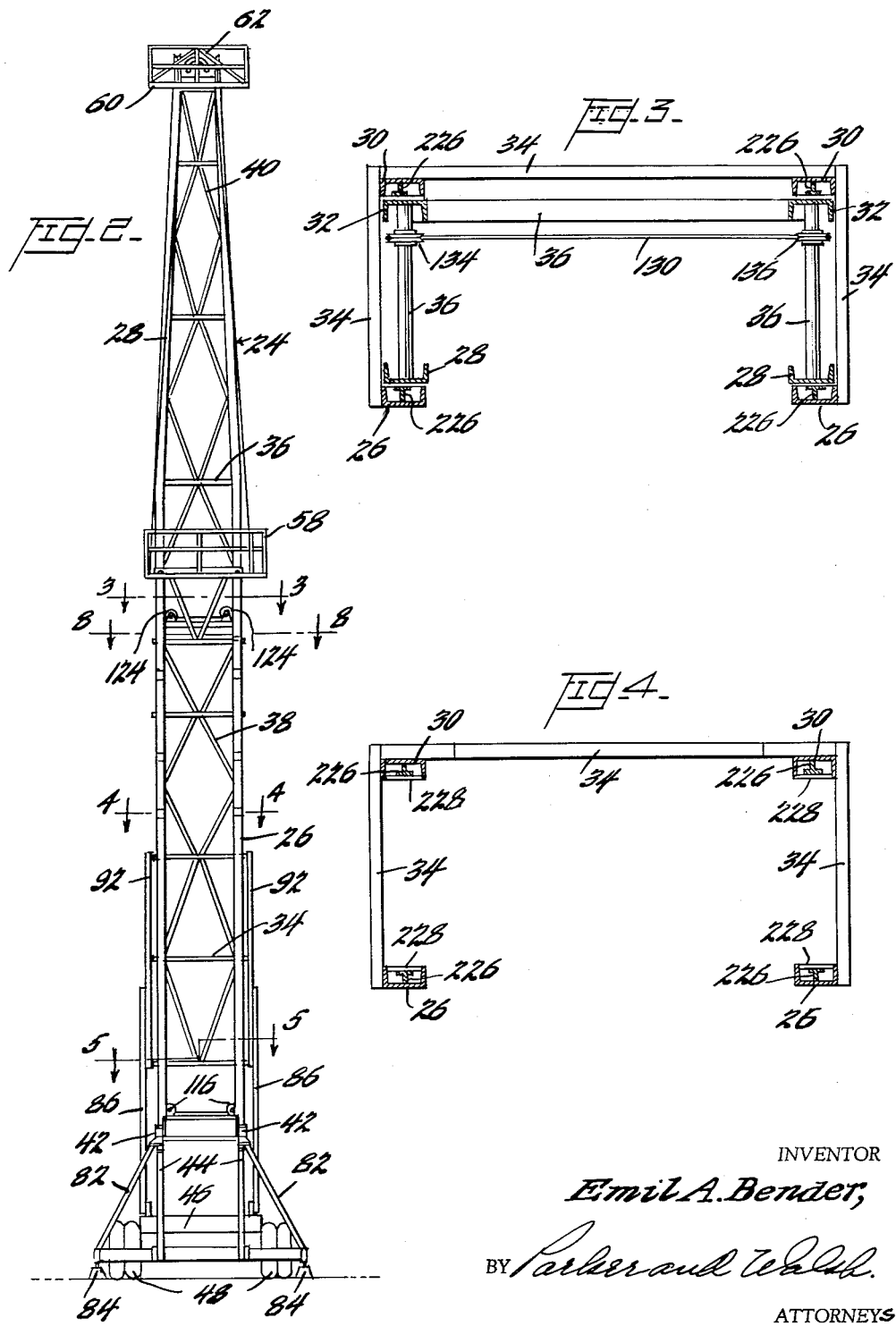
INVENTOR
Emil A. Bender,
BY Parker and Walsh
ATTORNEYS July 25, 1961  E. A. BENDER  2,993,570
PORTABLE TRAILER-MOUNTED DERRICK
Filed April 18, 1955  7 Sheets-Sheet 3
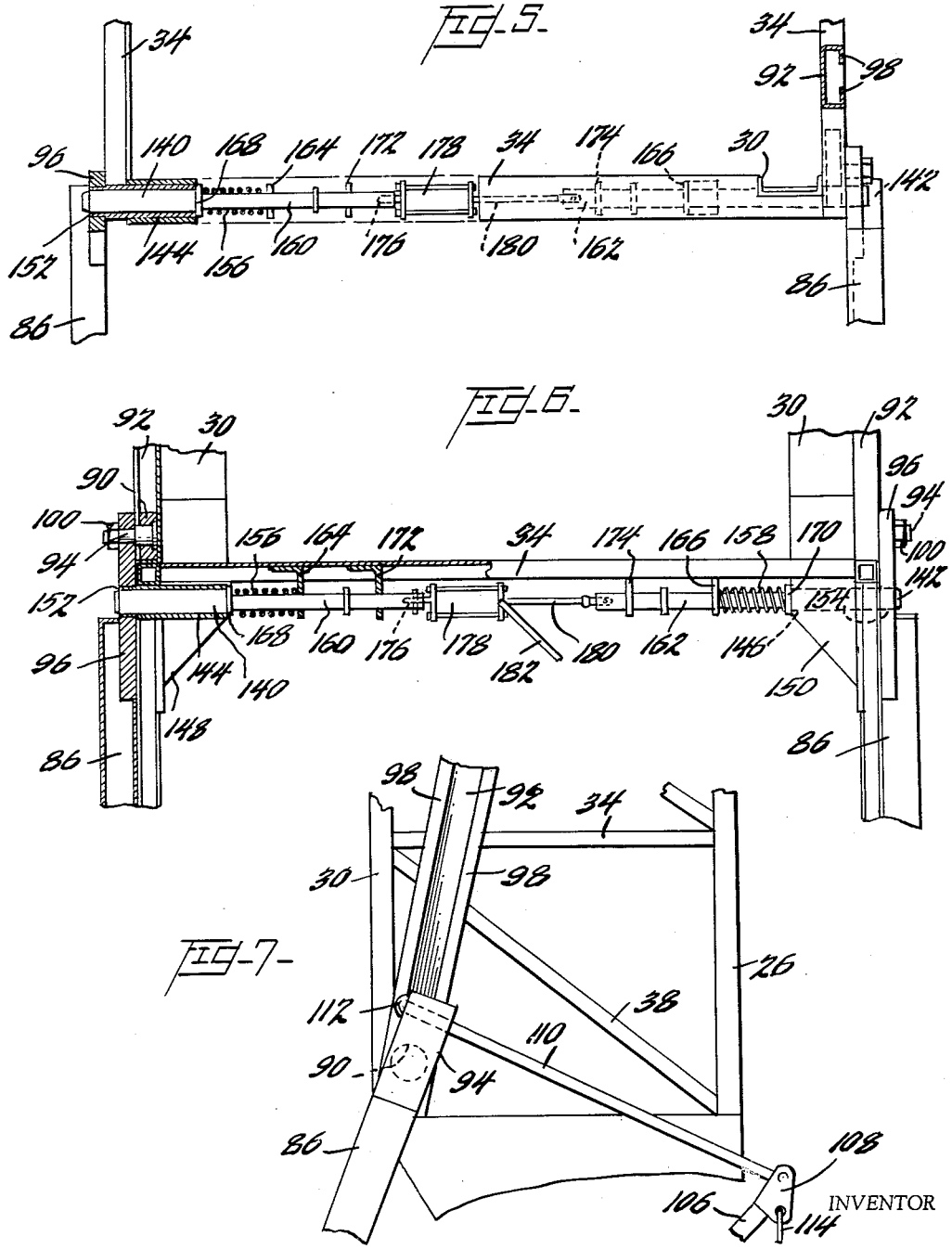

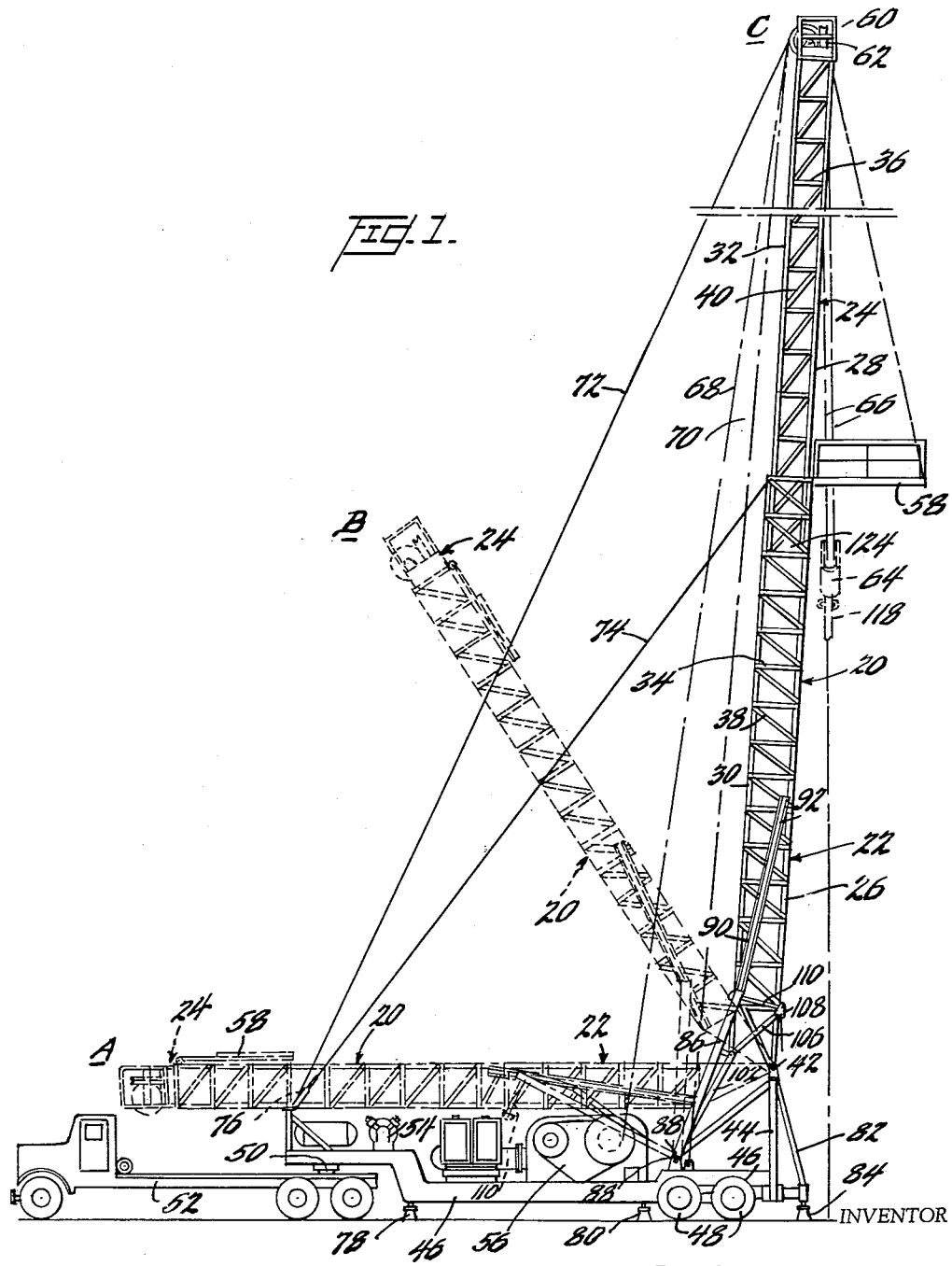

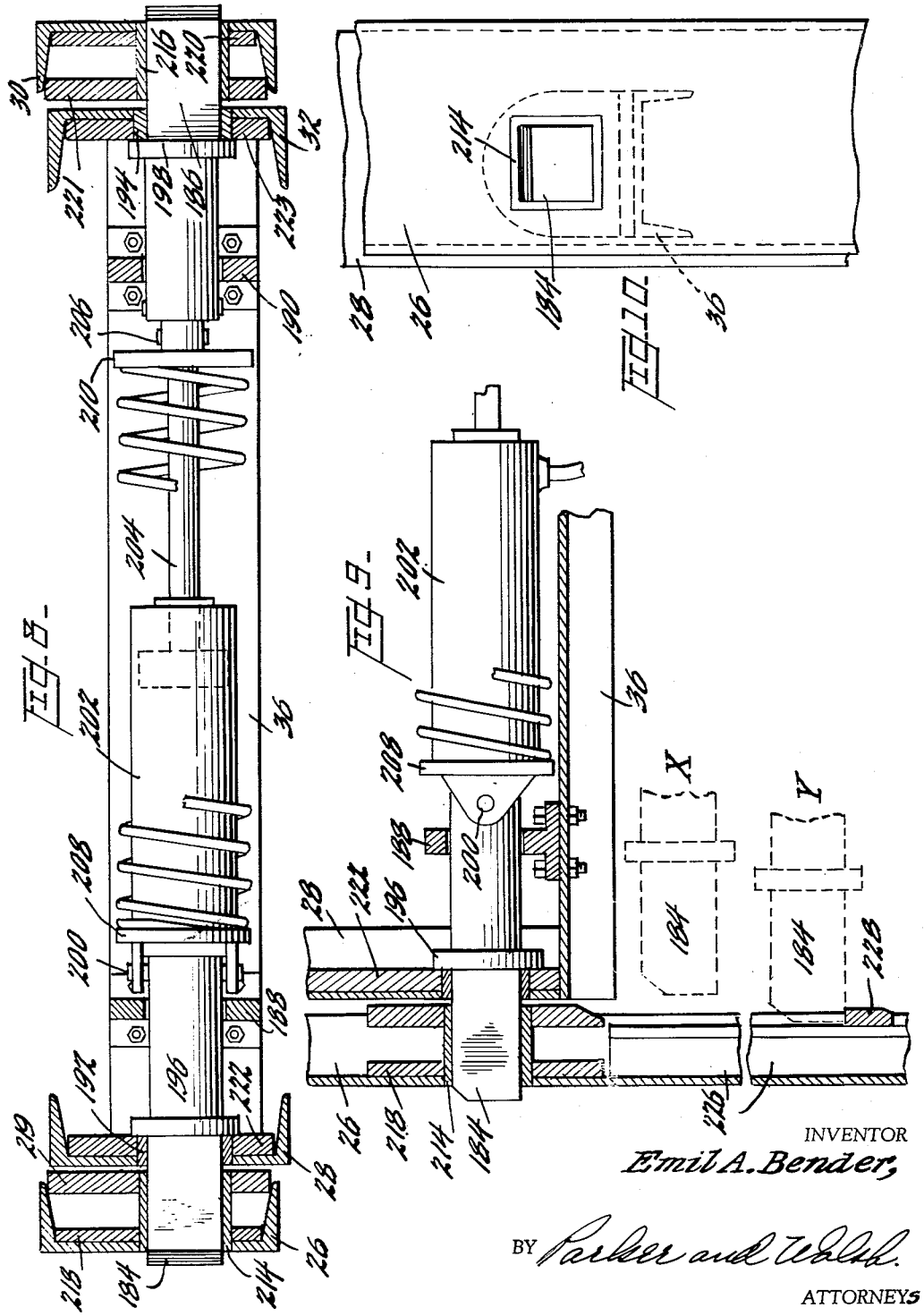

July 25, 1961  E. A. BENDER  2,993,570
PORTABLE TRAILER-MOUNTED DERRICK
Filed April 18, 1955  7 Sheets-Sheet 5
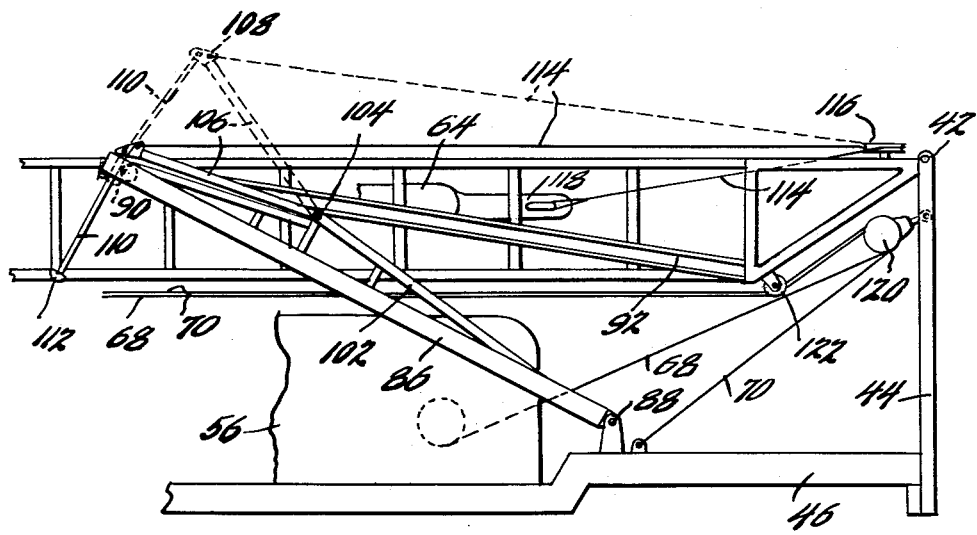
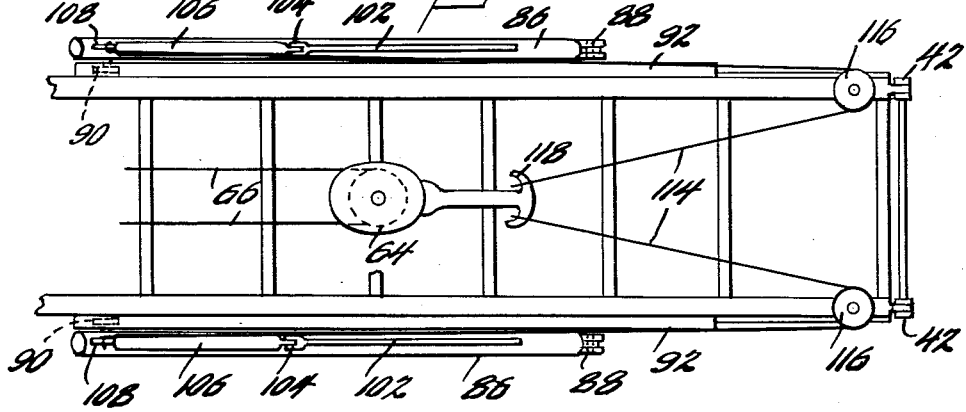
INVENTOR
*Emil A. Bender*
BY *Parker and Walsh*
ATTORNEYS

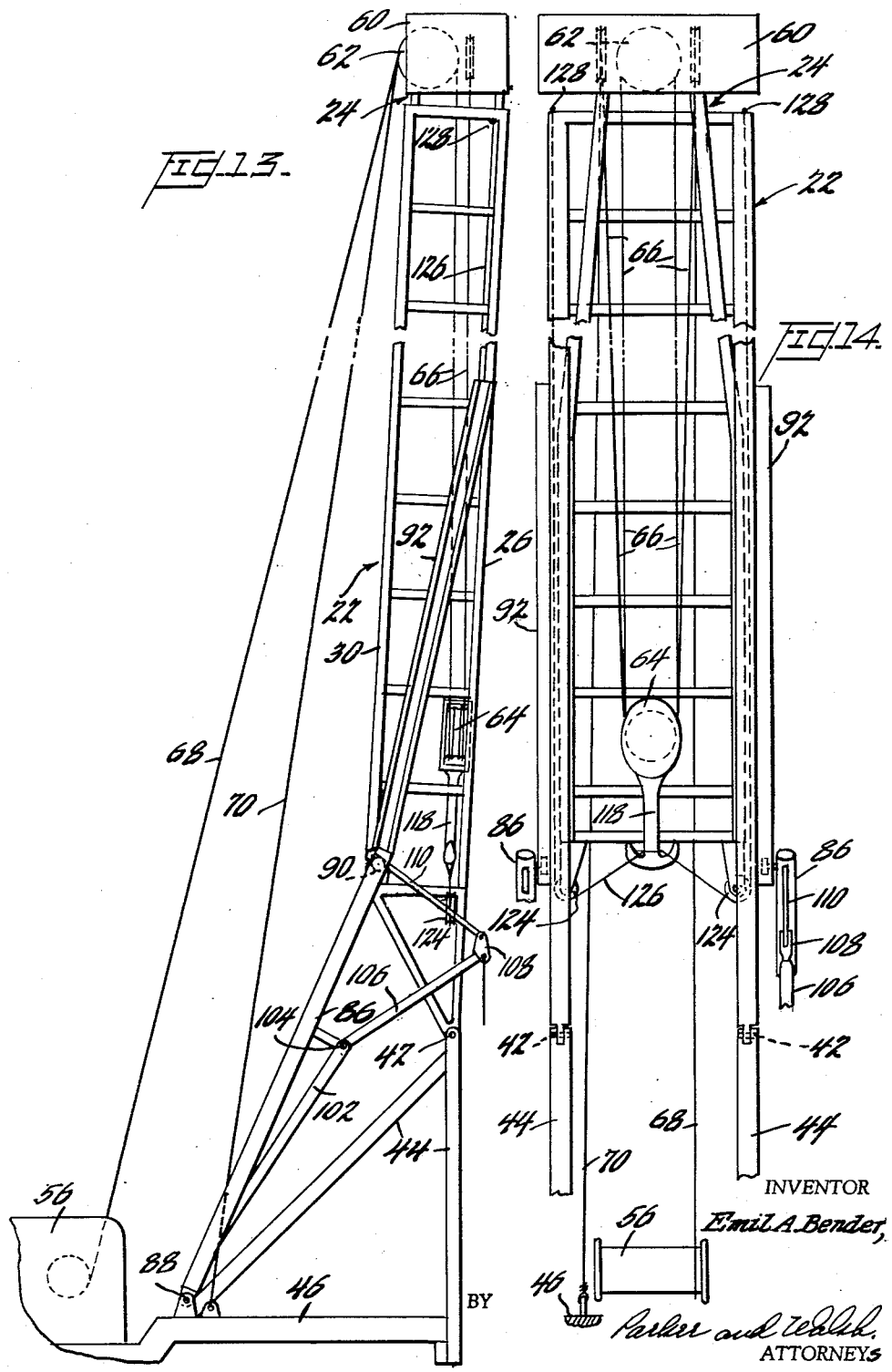

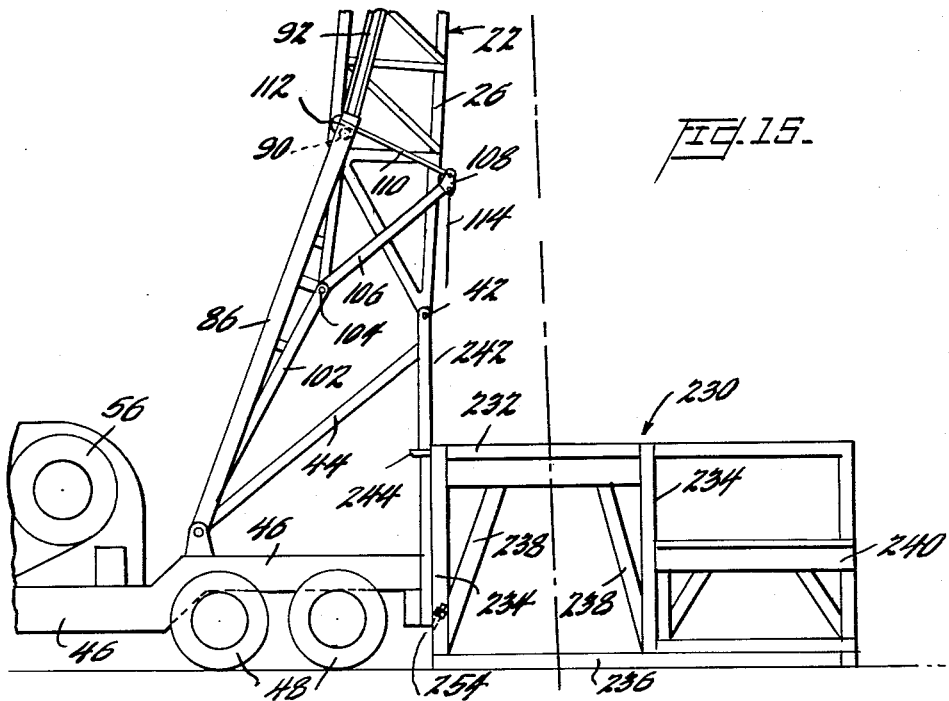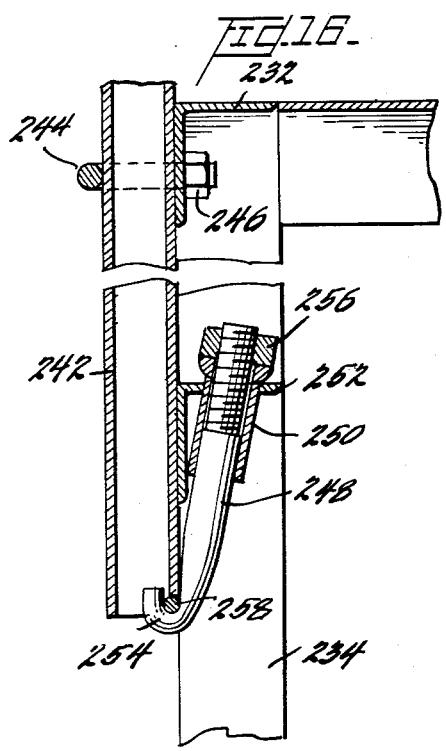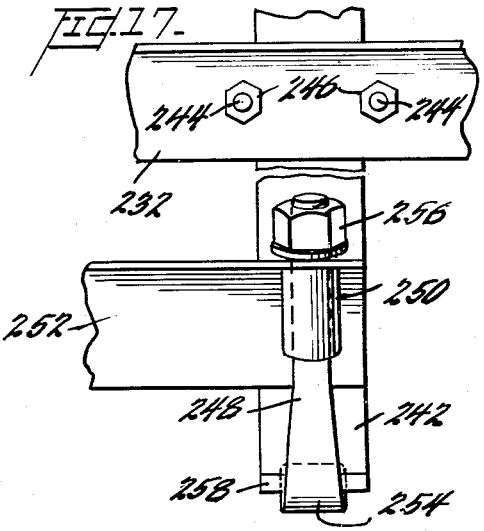

United States Patent Office 2,993,570
Patented July 25, 1961

2,993,570
PORTABLE TRAILER-MOUNTED DERRICK
Emil A. Bender, P.O. Box 56, Bakersfield, Calif.
Filed Apr. 18, 1955, Ser. No. 502,105
7 Claims. (Cl. 189—11)

The present invention relates generally to an oil derrick. More particularly, this invention relates to a derrick of the portable type which is adapted to be mounted upon a trailer and which may be moved as a self contained unit from one location to another for the drilling or servicing of wells.

As set forth in considerably greater detail in my copending application Serial No. 407,893, filed February 3, 1954, for Derrick Structure, the modern trend in the derrick art lies in the direction of portable derricks in order to avoid the necessity of leaving an expensive derrick structure as a permanent part of each well after completion of the drilling operation. At the same time, in view of the limitations and restrictions imposed by statute and otherwise upon the transporting of massive derrick structures, as well as the cost of the labor involved in erecting and dismantling a derrick of the size necessary to adequately service or drill the usual well, it is highly important that a modern derrick be truly portable and capable of conversion from transport condition to operating position with a minimum of labor and in the shortest possible time.

It is accordingly an important object of the present invention to provide an improved derrick of the type described which will be truly portable and yet of adequate size to withstand the stresses and loads to which it must be put in normal use.

Another object of the invention is to provide an improved derrick of the type described comprising relatively extensible derrick sections which may be raised together into operating position by means of lifting legs which, in raised position, become stress bearing members of the derrick structure.

A further object of the invention is to provide a portable derrick of the type described which may be elevated into an operating position extending slightly beyond the vertical and which is provided with movable brace elements which may be swung outwardly and rearwardly with respect to the derrick for the purpose of absorbing a portion of the over-center loads on the derrick during normal operation.

An additional object of the invention is to provide a portable derrick of the type described which may be moved into position beside a relatively fixed sub-base or other structure and secured to the latter by means of improved tensioning devices serving to secure the derrick and base together and to transmit operating loads therebetween.

Yet another object of the present invention is to provide improved semi-automatic latch mechanisms for safely securing together the lifting legs and the derrick body as well as the relatively extensible derrick sections of a portable derrick of the type described.

A still further object of the invention is to provide semi-automatic latch mechanisms for securing together the relatively movable sections of a portable derrick of the type described which incorporate additional safety features which may be operated upon failure of the normal extending mechanisms so as to prevent damage either to the derrick structure or any of the operating personnel.

Still another object of the invention is to provide improved mechanism for extending and retracting the relatively movable sections of a derrick of the type described.

The foregoing as well as numerous additional objects and advantages of the present invention will become more readily apparent to one skilled in the art from a consideration of the following detailed specification taken in conjunction with the accompanying figures of drawing in which:

FIGURE 1 is a side elevational view, to a vastly reduced scale, illustrating an overall assembly view of an improved portable derrick in accordance with the present invention wherein the derrick is shown in full lines in operating position and in dotted lines in two intermediate positions;

FIGURE 2 is a front elevational view of the derrick of FIGURE 1 taken from the rear of the trailer but showing the front or working face of the derrick in normal operating position;

FIGURE 3 is a horizontal, cross-sectional view taken substantially along the line 3—3 of FIGURE 2;

FIGURE 4 is a horizontal, cross-sectional view through the derrick taken substantially along the line 4—4 of FIGURE 2;

FIGURE 5 is a horizontal view in partial cross-section taken substantially along the line 5—5 of FIGURE 2 and illustrating a latch mechanism for securing the lifting legs to the lower derrick section;

FIGURE 6 is a front elevational view in partial cross-section of the lifting leg latch mechanism of FIGURE 5;

FIGURE 7 is a fragmentary side elevational view showing the upper end of one of the lifting legs similar to the showing in FIGURE 1 but to a somewhat enlarged scale;

FIGURE 8 is a partial horizontal, cross-sectional view taken substantially along the line 8—8 of FIGURE 2 and illustrating a latch mechanism in accordance with the present invention for securing together the upper and lower derrick sections;

FIGURE 9 is a fragmentary vertical, cross-sectional view taken through the left hand portion of the latch mechanism of FIGURE 8 and showing, in dotted lines, two other positions which the latch mechanism may assume during operation;

FIGURE 10 is an end elevational view of the latch mechanism of FIGURE 9;

FIGURE 11 is a fragmentary, side elevational view of a portion of the derrick of FIGURE 1 to a somewhat larger scale and showing the parts in their relative positions prior to the commencement of a derrick raising operation;

FIGURE 12 is a largely schematic top plan view illustrating the reeving arrangement of the line which transmits force to the lifting legs to raise the derrick sections from horizontal to vertical position;

FIGURE 13 is a largely schematic, side elevational view, to a somewhat larger scale, of a portion of the derrick of FIGURE 1, showing the parts in their relative positions prior to extending the inner derrick section;

FIGURE 14 is a front elevational view of the derrick of FIGURE 13, taken from the right hand side of the latter;

FIGURE 15 is a fragmentary side elevational view of a modified form of derrick in accordance with the present invention showing the same adjacent to a relatively fixed sub-base;

FIGURE 16 is a fragmentary vertical, cross-sectional view of one of the improved tensioning devices serving, in accordance with the present invention, to secure the derrick and sub-base of FIGURE 15 together; and FIGURE 17 is a fragmentary front elevational view of the improved tensioning device of FIGURE 16.

Referring now in somewhat greater detail to the various figures of the drawing, and in particular to FIGURE 1 thereof, there is illustrated an improved portable derrick in accordance with the present invention showing the same in three different positions which it may occupy at different stages of erection. The main derrick structure or body is designated generally by the reference numeral 20 and includes a lower derrick section 22 within which is telescopically mounted an upper derrick section 24. Each of the derrick sections, 22—24, is formed as an integral assembly having front legs 26—28, rear legs 30—32 and the usual girts 34—36 and braces 38—40. The derrick sections are preferably formed of channel, box or angle section beams and it will be understood that the legs, braces and girts are suitably secured together, as by welding or the like, in such manner as to form relatively rigid sections of truss construction.

Still referring to FIGURE 1 of the drawings, it will be noted that the lower derrick section 22 is pivotally connected as at 42 to a pyramidal structure designated generally by reference numeral 44. The structure 44 in effect thus constitutes a hinge assembly which in turn is rigidly mounted in any convenient manner upon the extreme rear portion of the bed or frame 46 of a trailer having the usual tandem wheels 48. At its front end the trailer 46 is pivotally connected as at 50 to a suitable tractor 52 which furnishes the motive power for transporting the trailer and derrick over the highways and also for moving the latter into position adjacent a well site. The trailer 46 may also carry various other items necessary to constitute a complete drilling rig such as pumps 54 and a draw-works 56 but since these various devices do not, per se, form any part of the present invention, they will not be further described in detail.

As shown in FIGURE 1 and also in FIGURE 2, the derrick body is provided with the usual accessories such as the racking platform 58 and crow's nest 60, the latter surrounding a crown block assembly 62 connected to the usual traveling block 64 by means of running lines 66. Although the precise design of the various derrick accessories is not generally critical in the practice of the present invention, I prefer to employ a crown block assembly of the type covered by my prior Patent No. 2,440,427, issued April 27, 1948, and, accordingly, I have illustrated such a crown block assembly in FIGURE 1 from which extend rearwardly and downwardly the fast line 68 and dead line 70. In its raised or normal operating position, it will be noted that the derrick is tilted slightly beyond the vertical so that the traveling block 64 lies entirely outside the derrick structure. In the raised position, the derrick is steadied by a stay 72 and a tension line 74, the latter being connected to the trailer frame by means of a servo-motor 76, preferably of the pneumatic type, the function of which will hereinafter become more fully apparent.

As shown in FIGURES 1 and 2, the frame of the trailer 46 appears to be still connected to the tractor or truck 52 by means of the usual fifth wheel mounting 50. At the same time, the trailer frame 46 is shown as being mounted upon the usual pedestal jacks 78—80 which, in actual practice, are provided to take the complete load of the trailer 46 and the derrick 20 so that the derrick operating loads will not be transmitted through the trailer wheels 48 and the truck or tractor 52 may be disconnected and used to perform other desired services. The showing, therefore, particularly in FIGURE 1, is somewhat schematic or diagrammatic so that the relative positions of the various pieces of equipment will be readily apparent although in actual practice a composite assembly of the type shown in FIGURE 1 would probably not be employed. It must also be realized throughout the present specification that a derrick of the type shown in FIGURES 1 and 2 may actually be around one hundred to one hundred and thirty feet in height and it is therefore not only difficult to compress such a massive structure into the reduced scale of a patent drawing but it is likewise difficult to appreciate the many problems which arise from the sheer mass and size of the structures illustrated. For these reasons the illustrations of the drawings necessarily omit many details of construction which are deemed unnecessary to the practice of the present invention since they are, per se, well known to those skilled in the art.

Referring again to FIGURES 1 and 2 of the drawing, there is illustrated an important feature of the present invention which comprises a pair of out-rigger braces 82 of generally triangular shape, pivotally connected in any convenient manner, as by means of suitable fittings at the top and bottom portions, to the hinge assembly 44. The outrigger braces 82 are movable between a folded transport position and an outwardly and rearwardly extending operating position as shown in FIGURES 1 and 2, in which latter position they rest upon pedestal mountings 84 through which they transfer to the ground at least a portion of the over center loads on the derrick during its normal operation. It will be particularly noted that, by reason of the pivotal mounting of the outrigger braces 82 with respect to the vertical members of hinge assembly 44, they may occupy any of a relatively large number of positions extending outwardly and rearwardly from the trailer frame and its integral hinge assembly so that, in practice, the trailer may be backed up to a well site on which is mounted considerable apparatus such as pumping jacks or the like without the necessity of removing such conventional equipment from the well. In other words, the outrigger braces 82 may be adjusted in such manner as to embrace the configuration of such well equipment as may already be present at the well site and still serve their function of absorbing the over center loads on the derrick.

The derrick structure in accordance with the present invention, as mentioned above, is pivotally connected at 42 to the hinge assembly 44 which forms a permanent part of the trailer frame 46 and the entire derrick body 20 is thus, in effect, a permanent part of the trailer although movable with respect to the latter. As shown in FIGURE 1, the derrick 20 is normally transported in the horizontal position, the derrick sections 22—24 occupying a nested or retracted position as illustrated in dotted lines at A in FIGURE 1. For the purpose of elevating the derrick 20 into its normal operating position which lies slightly beyond the vertical, I have provided elevating means in the form of a pair of lifting legs 86 pivotally connected as at 88 to the lower front portion of the hinge assembly 44 and having rollers 90 at their opposite ends (FIGURES 1 and 6) engageable within tracks 92 formed at opposite sides of the lowermost derrick section 22 and lying exteriorly of the derrick truss structure.

Although the use of the lifting legs 86 in conjunction with the telescoping upper and lower derrick sections constitutes an important feature of the improved derrick in accordance with the present invention in view of the true portability which such combination lends to the structure, the independent concept of utilizing lifting legs in slidable engagement with track means formed on a derrick body for raising the latter into elevated position and thereafter becoming a fixed part of the complete derrick structure is not, per se, a part of the present invention. This lifting leg principle is, however, basically disclosed in my prior patent No. 2,593,246, issued April 15, 1952, and a modified form of such apparatus is also disclosed in my co-pending application Serial No. 407,893, filed February 3, 1954. Reference may be had to my said prior patent and co-pending application for a more full and detailed discussion of the principles involved in utilizing such lifting leg apparatus. For the purposes of the present invention, the lifting legs are illustrated rather schematically in FIGURES 1, 2, 5, 6, 7, 11, 12, 13, 14 and 15. As shown at the left hand side of FIGURE 6, each of the rollers 90 is rotatably mounted on a bearing 94 journaled in a solid plate extension 96 secured to the outer end of each of the lifting legs 86 in any suitable manner as by welding or the like. The rollers 90 are retained within the tracks 92 by reason of the shape of the latter which have inwardly turned guiding flanges 98 as shown in FIGURE 7 and at the right hand side of FIGURE 5. The bearings or axles 94 on which the rollers 90 are mounted may be held in place in the plates 96 in any convenient manner as by means of the lock nuts 100 (FIGURE 6).

Referring particularly to FIGURES 1, 7, 11 and 12, it will be noted that each of the lifting legs 86 is provided with a generally pyramidal shaped wing brace 102, at the apex of which is pivotally mounted, as indicated by reference numeral 104, an extension arm 106. At its outer end each arm 106 is provided with a bracket 108 to which is pivotally connected a tension rod 110 which in turn extends through a suitable aperture formed at the end of the lifting leg 86 and terminates in an enlarged head 112. The opposite sides of both brackets 108 are connected to the opposite ends of a raising line 114 reeved through a pair of pulleys 116 pivotally mounted in any convenient manner in the bottom of the lower derrick section, and the bight of the line 114 is securely fastened around the hook 118 of the travelling block 64.

From the immediately preceding description, it will be apparent that each of the extension arms 106 is capable of limited pivotal movement about the pivot 104 relative to the braces 102. The outer or uppermost position of one of the arms 106 is shown in dotted lines in FIGURES 1 and 11, and is partially shown in full lines in FIGURE 7, and it will be understood that the size of the heads 112 is such that, after assembly, they cannot pass through the apertures in the lifting legs 86, as a result of which the tension rods 110 serve to limit the extent of pivotal movement of the arms 106. However, when the derrick is in transport position on its trailer, the arms 106 and rods 110 assume the positions illustrated in full lines in FIGURE 11, thereby substantially reducing the overall height of the lowered derrick assembly but, at the same time, being readily available for extension to the dotted line position of FIGURE 11 so as to improve the leverage or starting movement at the beginning of a derrick raising operation.

As disclosed in my above mentioned prior patent and co-pending application, the necessary motive power for operating the lifting legs to elevate the derrick body from horizontal to vertical position preferably is obtained from the usual draw-works through the connection to the travelling block which has just been described. Although the operation of the complete derrick will be hereinafter described in greater detail, it may be observed at this point that, with the parts in the positions as illustrated in full lines in FIGURE 11, that is, with the derrick in substantially horizontal transport position, if power is applied to the draw-works 56, the fast line 68 will exert a pull on the travelling block 64 causing the latter to move to the left in FIGURE 11. During this phase of the raising operation, the fast line 68 is reeved through a snatch block 120 and over a pulley 122 (FIGURE 11) serving merely as guides and the dead line is similarly guided by apparatus which has been omitted from the drawings for the sake of clarity. As soon as the travelling block 64 begins to exert a pull on the line 114 through the hook 118, the arms 108 and rods 110 will move to the position shown in dotted lines in FIGURE 11 at which point the heads 112 will abut the lifting legs 86 and cause the latter to begin to pivot about their pivots 88. The lifting force thus produced will be transmitted to the derrick body through the rollers 90 riding in the tracks 92 thereby causing the entire derrick assembly to pivot about the main hinges 42.

After the derrick has been raised in the manner just described, and after certain other operations have been performed as will be hereinafter more fully set forth, the inner derrick section 24 is next extended upwardly from its telescoped or retracted position within the lower derrick section 22. The motive power for accomplishing this operation is also preferably obtained from the same derrick draw-works by means of an arrangement best illustrated in FIGURES 13 and 14. As shown in these views, there is another pair of pulleys 124 suitably secured in any convenient manner adjacent the lower end of the inner derrick section 24, through which is reeved a line 126. The opposite ends of the line 126 are securely fastened at fixed points 128 located adjacent the top of the outer or lower derrick section 22 and the bight of the line 126 is securely looped over the hook 118 of the travelling block 64. With the parts in the positions shown in FIGURES 13 and 14, if power is applied at the draw-works to raise the travelling block 64, tension will be uniformly exerted by the line 126 through the pulleys 124 to cause the inner derrick section 24 to move upwardly relative to the outer section 22. As long as the force multiplication factor of the travelling block-crown block assembly exceeds that available through the line 126 and pulleys 124, the arrangement is effective to cause extension of the inner derrick section.

Referring now particularly to FIGURES 5, 6 and 7 of the drawing, there is illustrated a preferred embodiment of the latch mechanism for positively locking the lifting legs 86 to the derrick body upon completion of a derrick raising operation so that the lifting legs become, in effect, an integral part of the derrick structure itself and capable of absorbing working loads on the latter and transmitting such loads through the trailer frame 46 to the ground. The latch structure, in accordance with the present invention, is seen to comprise a pair of locking bars 140—142 slidably mounted in bushings 144—146 formed at opposite sides of the lower derrick section 22 in the rear face thereof adjacent its lower end. The bushings 144—146 may be formed in any suitable manner and as shown comprise tubular members welded to the derrick body and braced in position as by means of gusset plates 148—150. When the lifting legs 86 are in their uppermost position, at which time the rollers 90 will be at the extreme bottom end of the tracks 92, the locking bars or bolts 140—142 may project outwardly through corresponding apertures 152—154 formed in the vertical faces of the extension plates 96 at the end of each lifting leg 86. In the position as illustrated in FIGURE 6, the locking bars 140—142 are seen to project outwardly through the apertures 152—154 thus serving to firmly secure together and lock the lifting legs 86 to the rear legs 30 of the lower derrick section 22.

The locking bars 140—142 of FIGURES 5 and 6 normally are urged outwardly or into locking position by means of a pair of coil springs 156—158 which surround the rods 160—162 formed as extensions of the locking bars 140 and 142 respectively. The springs 156—158 are under compression between the depending brackets 164—166 and shoulders 168—170 formed at the juncture of the rods 160—162 and their corresponding locking bars 140—142. It will be understood that the depending brackets 164—166 are rigidly secured in any suitable manner as by welding or the like to the lowermost girt 34 at the rear face of the lower derrick section 22 and are suitably apertured in such manner as to provide a slidable support for the rods 160 and 162.

Still referring to FIGURES 5 and 6, it will be noted that at their inner ends the rods 160—162 are slidably supported by another pair of apertured brackets 172—174 which are rigidly secured to the girt 34 and depend therefrom. At its inner end the rod 160 is connected, as by means of a universal type mounting 176, to the housing or cylinder of a pneumatic servo-motor 178, the rod 180 of which is similarly connected to the inner end of the rod 162. The servo motor 178 is under the control of an air line 182 provided with suitable valve means (not shown) so arranged that air under pressure may be admitted or discharged into the servo-motor. In this way the locking bars 140—142 are normally urged outwardly or into locking engagement with the apertures 152—154 by means of the springs 156—158 but may be fully retracted clear of such apertures upon the admission of air under pressure through the control line 182 into the servo-motor 178.

In addition to the pneumatically controlled latch mechanism for securing together the lifting legs and the derrick body which has just been described, I have also provided improved latching devices of somewhat similar construction for securing together the upper and lower derrick sections so as to positively retain the upper section in its extended position. Since the derrick sections slide relatively freely with respect to each other and there is no fixed support to retain the upper section in its extended position, suitable latch mechanism to accomplish this purpose is preferably provided adjacent each of the four corners of the derrick body. As best illustrated in FIGURES 8, 9 and 10, this latch mechanism comprises two pairs of locking bars 184—186, only a single pair being illustrated in the drawing for the sake of clarity since both pairs are substantially identical. The locking bars 184—186 are preferably in the form of square, solid shafts slidably mounted in suitable brackets 188—190 which in turn are bolted to the girts 36 at opposite sides of the lower end of the upper derrick section. The locking bars 184—186 likewise project through suitable bushings 192—194 suitably secured, as by welding or the like, in the web portions of the front and rear derrick legs 28—32, respectively, and stops in the form of shoulders 196—198 are provided on the bars 184—186 in order to limit the maximum outward movement of the bars through their associated bushings. At its inner end, the bar 184 is connected, as by means of a universal type fitting or the like 200, to the cylinder of a pneumatic servo-motor 202, the rod 204 of which is connected to the inner end of the other bar 186 as indicated at 206. The cylinder 202 and piston rod 204 are respectively provided with collars 208 and 210 between which extends a compression spring 212 continuously urging the locking bars 184 and 186 outwardly or into locking position.

In their outermost position as illustrated in FIGURE 8 and in solid lines in FIGURE 9, the locking bars 184—186 extend through corresponding bushings 214—216 secured in any convenient manner, as by welding or the like, to the web portions of the front and rear legs 26—30 of the lower derrick section adjacent the upper end of the latter. In order to provide the necessary strength for the assembly, the derrick legs 26—30 of the lower derrick section adjacent the bushings 214—216 may be provided with reinforcing plates 218—219 and 220—221, respectively, the entire assembly being welded or otherwise rigidly secured together in order to provide for firm locking engagement, and the legs 28—32 of the upper derrick section 24 may likewise be provided with suitable reinforcing plates 222 and 223 in the region adjacent the bushings 192—194.

The pneumatic servo-motor 202, one of which it will be understood is provided at each side of the derrick adjacent the bottom of the upper section, is also provided with an air control line 224 having suitable valve means (not shown) under the control of the operator for either admitting air under pressure to retract the piston rod 204 against the compression of the coil spring 212 or exhausting air from the cylinder 202 thus permitting the locking bars 184—186 to move outwardly towards locking position.

As set forth in the statement of objects of the invention, an important feature of the present invention resides in the safety latch construction which may be quickly operated in such manner as to prevent the upper derrick section from falling in an uncontrolled manner within the lower derrick section upon failure of the normal apparatus for extending the upper section. This feature is best illustrated in FIGURE 9 wherein I have shown in dotted lines two other positions which the locking bar 184 may occupy as the upper derrick section is being moved relative to the lower derrick section. As illustrated in FIGURE 9 and also in FIGURES 3 and 4, each of the front and rear derrick legs 26—30 of the lower derrick section 22 is provided with a guiding element in the form of a beam of T-shape in cross section welded or otherwise suitably secured to the web portions of the leg channels. Since all of these guide members are substantially identical they are referred to throughout by the same reference character 226. At suitable intervals throughout their entire length, which intervals may, if desired, correspond to the spacing of the lower derrick section girts, each of the guide members 226 is provided with a solid plate 228 preferably welded to the guide 226 and also to the adjacent flanges of the leg channel in such manner as to provide a series of abutments spaced at intervals along the entire length of the lower derrick section beneath the primary locking apertures formed by the bushings 214 and 216. During a normal operation as the upper derrick section is being extended relative to the lower section, the locking bars 184—186 will occupy the position as indicated by reference character X in FIGURE 9. However, should the normal extending mechanism fail to function properly, the operator need only release the air pressure from the control line 224 thus enabling the spring 212 to move the locking bolts outwardly at which time they will occupy the position illustrated schematically by reference character Y in FIGURE 9. In this way, the locking bars 184—186 may be projected outwardly in a semi-automatic manner so that as the upper derrick section moves downwardly within the lower derrick section the locking bars will strike the abutments provided by the plates 228 thereby preventing further downward movement of the upper derrick section.

Although the derrick which has been described thus far is perfectly capable of performing independent well drilling operations, it is especially adapted for the performance of servicing operations on existing well, that is, wells which have already been completed but which, for any of many different reasons, may require reworking, cleaning, or other special attention. As previously pointed out, one of the features of the derrick thus far described which renders it particularly suitable for use in servicing an existing well comprises the foldable outrigger braces 82 which may be swung outwardly and rearwardly relatively to the trailer frame in such manner as to provide the desired support for the over-center loads on the derrick without the necessity of removing a substantial quantity of equipment forming an integral part of the producing well. The principles of the present invention, however, may be applied with equal facility to an independent or original well drilling operation in connection with which it is usually desirable, for other reasons, to utilize a sub-base or relatively fixed drilling platform surrounding the actual center line of the well. A preferred adaptation of my improved derrick for use in such an operation is illustrated in FIGURES 15, 16 and 17.

In referring specifically to the modified form of the invention as illustrated in FIGURES 15, 16 and 17, it is to be clearly understood that substantially all of the various derrick features which have already been described are also employed in the modified derrick with the major exception of the outrigger braces 82. As shown in FIGURE 15, the rear end of the trailer frame 46 has been moved adjacent to a relatively fixed sub-base designated generally by reference numeral 230 the left hand portion of which surrounds the center line of the well to be drilled. As is well understood by those skilled in the art, a typical sub-base of this type may be formed of heavy steel beams bolted together in such manner as to form a drilling platform 232 supported by a plurality of vertical beams 234 from a foundation structure 236. The sub-base 230 may also include the usual knee braces 238 and in addition there may be other instrumentalities such as a pipe bin 240 attached directly to the sub-base 230.

It will be appreciated that the use of outrigger braces in conjunction with such a relatively massive, fixed sub-base would be extremely difficult at best and, furthermore, through inability to extend such outrigger braces to any appreciable rearward distance relative to the trailer frame, the important function of such outrigger braces in absorbing part of the over-center loads on the derrick would be in large measure lost.

In order that the modified form of derrick may be properly supported during drilling operations, I have provided novel apparatus for attaching the derrick to the sub-base in such manner as to transmit the derrick loads through the sub-base to the ground. As shown in FIGURE 15, the hinge assembly 44 which is mounted directly on the trailer frame 46 and carries the main derrick hinge 42 includes a pair of generally vertical, open-ended beams 242 attached to the trailer frame 46 in any convenient manner as by welding or the like and extending downwardly a substantial distance at the extreme rear end of the frame 46. It will be noted that the beams 242 thus, in effect, constitute downward extensions of the front legs 26 of the lower derrick section 22 as well as forming part of the generally pyramidal hinge assembly 44. The beams 242 are attached to the sub-base 230 by means of U-bolts 244 and nuts 246 mounted in any convenient manner in the upper drilling platform 232 which are in tension only and by means of a novel pair of tensioning devices comprising generally J-shaped bolts 248 having their threaded shanks slidable within bushings 250 which in turn are mounted in any suitable manner within one of the sub-base beams 252 at a relatively slight angle from the vertical. The J-bolts 248 are provided at their lower ends with flattened, upwardly open hook portions 254 engageable within the downwardly open ends of the beams 242. At their opposite ends, the J-bolts 248 are provided with suitable nuts 256 in threaded engagement with the J-bolt shanks and it will be understood that with the parts in the positions as illustrated in FIGURE 16, tightening the nuts 256 will cause the J-bolts 248 both to resist any downward forces exerted by the beams 242 and at the same time, by reason of the slightly inclined mounting thereof, to pull the beams 242 tightly against the sub-base structure represented by the beams 252, 232 and 234. Since the construction just described will result in transmitting substantially the full load from the front derrick legs 26 through the J-bolts 248 to the sub-base 230 rather than through the trailer wheels 48 to the ground, the magnitude of such forces may be quite high so that I prefer to employ a solid bar 258 welded to the lower open ends of the beams 242 and properly shaped to fit evenly within the flattened hook portions 254 of the J-bolts 248.

*Operation*

In describing the operation of my improved derrick in accordance with the present invention, reference will be had principally to that form of the derrick illustrated in FIGURE 1 of the drawing. However, it is to be clearly understood that the operation of the modified form of derrick illustrated in FIGURE 15 is substantially identical except that the outrigger braces 82 are omitted and the J-bolts 248 provided for the purpose of attaching the derrick to an existing sub-base.

Referring, therefore, to FIGURE 1, the derrick is shown in three different positions which it would occupy in preparation for a drilling or well servicing operation. As illustrated in dotted lines in position A, the upper derrick section 24 is telescoped within the lower derrick section 22 so that the entire derrick structure as designated generally by reference numeral 20 occupies a substantially horizontal position upon the trailer 46. In this initial position the derrick is pivoted forwardly about the hinge 42 and overlies both the trailer 46 and the tractor or truck 52. In position A the lifting legs 86 are also extended forwardly from their pivots 88 and the rollers 90 lie at the extreme upper or forward portion of the tracks 92. The position of the parts in FIGURE 1A is, therefore, the transport position and, with the parts as shown, the entire assembly may readily be trucked over the public highways and a complete drilling rig moved into position by backing the trailer up to a producing or pumping well which is to be serviced.

After the complete assembly has been moved into proper position adjacent the well to be serviced with the derrick occupying the position designated by reference character A, the pedestal jacks 78—80 may be placed in position and operated in a manner well known in the art to level the trailer frame 46 and to support the latter upon the ground thereby taking the load off of the wheels 48 and the tractor 52. At this point the tractor 52 may be disconnected from the trailer at the point 50 and driven away for use as desired. The outrigger braces 82 are then swung outwardly from their folded positions and carried rearwardly a sufficient distance to surround or embrace the well head equipment. The pedestal jacks 84 may then be placed in position and firmly joined to the outrigger braces 82 in order to further transmit derrick loads to the ground.

After the tractor 52 has been disconnected and the outrigger braces 82 placed in proper position, the lifting legs 86 may next be actuated by applying power to the draw-works 56 and from it through the line 114 and the pulley arrangement illustrated in FIGURES 11 and 12 to the rollers 90 in slidable engagement with the tracks 92. As power is thus applied to the rollers 90, both of the derrick sections 22—24 will be gradually raised about the main derrick hinge 42 until the parts occupy the relative positions as indicated generally by reference character B. As the elevating action of the lifting legs 86 is continued the derrick body 20, with the upper and lower derrick sections still in nested relationship, eventually will move to a vertical position at which time further movement beyond the vertical will be resisted by the line 74 and servomotor 76. Once the derrick body has been moved even slightly beyond the vertical, the application of force to the lifting legs 86 may be discontinued since the force of gravity acting through the center of gravity of the derrick structure will be sufficient to continue the derrick movement beyond the vertical position to the desired operating position. During this final movement, the derrick is under the control of the servo-motor 76 and as air is gradually released from the latter the derrick sections, still nested, will move into their correct operating positions.

At this point the upper derrick section 24 may now be extended or moved upwardly relative to the lower derrick section 22 in order to provide the necessary derrick height for conducting drilling operations. The extension of the upper derrick section 24 is accomplished by means of the pulley system illustrated in FIGURE 13 since application of force to the draw-works 56 will cause the line 126 to apply a lifting force to the pulleys 124 and through the latter to the upper derrick section 24 to which they are attached. Continued operation of the draw-works will cause the upper derrick section 24 to move to the position as designated generally by reference character C in FIGURE 1 at which point the stay 72 is suitably adjusted to resist any overturning movements upon the upper derrick section or complete assembly.

In describing the operation of the derrick, the various steps have been set forth in a broad sequence in order to indicate the major steps in going through the successive positions indicated by reference characters A, B and C in FIGURE 1. In actual practice, of course, there are a number of intermediate steps, a most important one of which involves the operation of the latch mechanisms employed to secure the lifting legs 86 to the lower derrick section 22 when the latter reaches its fully raised position. These mechanisms are illustrated in FIGURES 5, 6 and 7 and include the locking bars 140—142 which are yieldingly urged outwardly by means of the coil springs 156—158 and which may be held inwardly or in retracted position by means of the servo-motor 178. Returning, therefore, to the initial operation of raising the nested derrick sections by means of the lifting legs 86, it will be understood that at this time the locking bolts 140—142 are held in retracted position by the application of air under pressure to the servo-motor 178 through the line 182 which is under the control of the operator. As the lifting legs 86 approach their final position, that is, with the derrick sections raised to final operating position, the air under pressure may be released from the line 182 and servo-motor 178 by the operator so that the locking bars 140—142 will snap outwardly into the apertures 152—154 provided in the plates 96 at the ends of the lifting legs 86 under the impetus provided by the coil springs 156—158. In this way the lifting legs 86 become, in effect, a rigid and integral part of the derrick structure and serve to transmit a portion of the derrick operating loads through the pivot points 88 to the trailer frame 46 and ultimately to the ground. Although additional latch means may be provided if desired, I have found that for most well servicing operations these latches are entirely adequate and constitute a positive connection between the lifting legs 86 and the derrick body 20.

Another intermediate operation in the erection of the derrick of FIGURE 1 is the operation of the latch mechanisms for securing the upper and lower derrick sections together when the upper derrick section has reached its fully extended position so as to take the derrick operating loads off of the extending line 126. These latch mechanisms are illustrated in FIGURES 8, 9 and 10 of the drawing and, as previously described, it will be understood that there are two separate pairs of locking bars 184—186, one pair being arranged at each side of the upper derrick section adjacent its extreme bottom portion. While the upper derrick section 24 is being extended relative to the lower derrick section 22 by means of the draw-works and the line 126 in the manner previously described, the locking bars 184—186 are held in retracted position against the normal urging of the coil spring 212 by means of air under pressure applied to the servo-motor 202 through the control line 224. This position of the parts is illustrated in dotted lines by reference character X in FIGURE 9. When the upper derrick section 24 reaches its fully extended position relative to the lower derrick section 22, the operator may then open the valve connected to control line 224 releasing the air under pressure from the servo-motor 202 whereupon the spring 212 will force the locking bars 184—186 into their respective bushings 214—216 provided in the upper portion of the lower derrick section 22 thereby securely locking the two derrick sections together.

The final or locked position of the locking bars 184—186 just described is illustrated in FIGURE 8 and also in full lines in FIGURE 9. Also, as previously mentioned, the position of the locking bars 184—186 while the upper derrick section is being extended is illustrated in dotted lines in FIGURE 9 and designated by reference character X. In this position of the locking bars, it will be noted that they are fully retracted and clear of any contact with the T-shaped guides 226. However, if an emergency should arise for any reason during the extension of the upper derrick section 24, the operator may immediately open the valve connected to the control line 224 whereupon the locking bolts 184—186 will be projected outwardly by the spring 212 into contact with the T-shaped members 226. If the upper derrick section 24 is then either lowered under control or drops in an uncontrolled manner, the locking bars will abut against the plates 228 thereby preventing any further downward movement of the upper derrick section until such time as the trouble may be remedied.

In the modified form of derrick illustrated in FIGURES 15, 16 and 17, it will be understood that all of the features thus far described are likewise present with the exception of the pivotally mounted outrigger braces 82. In the form of device illustrated in FIGURE 15, the trailer may be backed up to a relatively fixed sub-base 230 so that the upwardly opened, flattened hook portions 254 of the J-bolts 248 may be engaged with the shaped bars 258 at the bottom ends of the beams 242. Tightening of the nuts 256 will then serve to place the J-bolts 248 in tension thereby both drawing the sub-base and derrick firmly together and also transmitting the normal downward operating loads upon the front legs 26 of the derrick through the J-bolts 248 to the sub-base 230. The U-bolt 244 is likewise tightened in position but serves merely as a clamp to hold the upper portion of the beams 242 securely in engagement with the sub-base 230.

It will be apparent that numerous other modifications, alterations, and deviations from the specific structures which have been shown and described herein solely for the purpose of illustration of a preferred embodiment will occur to one skilled in the art without departing from the spirit and scope of the invention as set forth in the following claims.

I claim:

1. A portable well rig comprising a wheeled trailer having a generally horizontal frame, a derrick hinge assembly rigidly secured to said frame at the rear end of the latter, a lower derrick section of truss construction pivotally mounted on said hinge assembly for movement between a substantially horizontal transport position overlying said frame and a raised operating position tilted beyond the vertical, an upper derrick section of truss construction telescopically mounted within said lower section for movement between a retracted transport position and an extended operating position, a pair of tracks mounted at opposite sides of said lower derrick section exteriorly thereof, a pair of lifting legs pivotally mounted at one end on the lower portion of said hinge assembly and having rollers at their opposite ends slidably engageable with said tracks, a power winch on said frame, means operatively interconnecting said winch and said legs for raising said lower section to operating position, first power actuated latch mechanisms mounted on said lower section and engageable with said legs for positively locking said lower section in raised over-center position, means operatively interconnecting said winch and said upper section for extending and retracting the latter relative to said lower section, second power actuated latch mechanisms mounted adjacent the lower end of said upper section and engageable with said lower section to positively lock said upper section in extended position, a pair of stabilizing lines connected between the upper end of said lower section and the front end of said frame each including a pneumatic expansible chamber motor for varying the length of said lines, and means for augmenting the action of the lifting means including wing braces formed upon that face of the lifting legs facing the derrick, a compression member pivoted on the wing of each of the wing braces for movement to and away from the outer end of its corresponding lifting leg, tension members removably connected adjacent the outer ends of the lifting legs and secured to the outer ends of the compression members and flexible means connecting the outer ends of said compression members with said power winch and means for guiding said flexible means to exert its tractive effort in the direction of lifting movement of said lifting legs.

2. A portable well rig comprising a trailer having a frame, a derrick hinge assembly rigidly secured to said frame at the rear end of the latter, a lower derrick section pivotally mounted on said hinge assembly for movement between a substantially horizontal transport position overlying said frame and a raised operating position tilted beyond the vertical, an upper derrick section telescopically mounted within said lower section for movement between a retracted transport position and an extended operating position, a pair of tracks mounted at opposite sides of said lower derrick section, a pair of lifting legs pivotally mounted at one end on the lower portion of said hinge assembly and having rollers at their opposite ends slidably engageable with said tracks, a power winch on said frame, means operatively interconnecting said winch and said legs for raising said lower section to operating position, first power actuated latch mechanisms mounted on said lower section and engageable with said legs for positively locking said lower section in raised over-center position, means operatively interconnecting said winch and said upper section for extending and retracting the latter relative to said lower section, second power actuated latch mechanisms mounted adjacent the lower end of said upper section and engageable with said lower section to positively lock said upper section in extended position, a pair of stabilizing lines connected between said lower section and said frame each including means for varying the length of said lines, and means for augmenting the action of the lifting means including wing braces formed upon that face of the lifting legs facing the derrick, a compression member pivoted on the wing of each of the wing braces for movement to and away from the outer end of its corresponding lifting leg, tension members removably connected adjacent the outer ends of the lifting legs and secured to the outer ends of the compression members and flexible means connecting the outer ends of said compression members with said power winch and means for guiding said flexible means to exert its tractive effort in the direction of lifting movement of said lifting legs.

3. A portable well rig comprising a frame, a derrick hinge assembly rigidly secured to said frame, a lower derrick section pivotally mounted on said hinge assembly for movement between a substantially horizontal transport position overlying said frame and a raised operating position tilted beyond the vertical, an upper derrick section telescopically mounted within said lower section for movement between a retracted transport position and an extended operating position, a pair of tracks mounted at opposite sides of said lower derrick section, a pair of lifting legs pivotally mounted at one end on said hinge assembly and having rollers at their opposite ends slidably engageable with said tracks, a power winch on said frame, means operatively interconnecting said winch and said legs for raising said lower section to operating position, first power actuated latch mechanisms mounted on said lower section and engageable with said legs for positively locking said lower section in raised over-center position, means operatively interconnecting said winch and said upper section for extending and retracting the latter relative to said lower section, second power actuated latch mechanisms mounted adjacent the lower end of said upper section and engageable with said lower section to positively lock said upper section in extended position, and means for augmenting the action of the lifting means including wing braces formed upon that face of the lifting legs facing the derrick, a compression member pivoted on the wing of each of the wing braces for movement to and away from the outer end of its corresponding lifting leg, tension member removably connected adjacent the outer ends of the lifting legs and secured to the outer ends of the compression members and flexible means connecting the outer ends of said compression members with said power winch and means for guiding said flexible means to exert its tractive effort in the direction of lifting movement of said lifting legs.

4. A portable well rig comprising a frame, a lower derrick section pivotally mounted on said frame for movement between a substantially horizontal transport position and a raised operating position tilted beyond the vertical, an upper derrick section telescopically mounted within said lower section for movement between a retracted transport position and an extended operating position, a pair of tracks mounted at opposite sides of said lower derrick section, a pair of lifting legs pivotally mounted at one end on said frame and having rollers at their opposite ends slidably engageable with said tracks, a power winch on said frame, means operatively interconnecting said winch and said legs for raising said lower section to operating position, first power actuated latch mechanisms mounted on said lower section and engageable with said legs for positively locking said lower section in raised over-center position, means operatively interconnecting said winch and said upper section for extending and retracting the latter relative to said lower section, second power actuated latch mechanisms mounted adjacent the lower end of said upper section and engageable with said lower section to positively lock said upper section in extended position, and means for augmenting the action of the lifting means including wing braces formed upon that face of the lifting legs facing the derrick, a compression member pivoted on the wing of each of the wing braces for movement to and away from the outer end of its corresponding lifting leg, tension members removably connected adjacent the outer ends of the lifting legs and secured to the outer ends of the compression members and means connecting the outer ends of said compression members with a source of tractive effort and means for directing said tractive effort in the direction of lifting movement of said lifting legs.

5. A portable well rig comprising a frame, a lower derrick section pivotally mounted on said frame for movement between a substantially horizontal transport position and a raised operating position tilted beyond the vertical, an upper derrick section telescopically mounted within said lower section for movement between a retracted transport position and an extended operating position, a pair of lifting legs pivotally mounted on said frame and slidably engageable with said lower section, power means having mechanical connection with said legs for raising said lower section to operating position, first power actuated latch mechanisms mounted on said lower section and engageable with said legs for positively locking said lower section in raised position, means operatively interconnecting said power means and said upper section for effecting relative movement between said sections, second power actuated latch mechanisms mounted on said upper section and engageable with said lower section to positively lock said upper section in extended position, and means for augmenting the action of the lifting means including compression members pivotally mounted, at their inner ends, upon the frame adjacent the pivotal axis of the lifting legs for radial movement about said axis in advance of said lifting legs, a compression member pivoted on the tension members removably connected adjacent the outer ends of the lifting legs and secured to the outer ends of the compression members and flexible means connecting the outer ends of said compression members with a source of tractive effort and means for guiding said flexible means to exert its tractive effort in the direction of lifting movement of said lifting legs.

6. A portable well rig comprising a frame, a lower derrick section pivotally mounted on said frame for movement between transport position and raised operating position tilted beyond the vertical, at least one upper derrick section telescopically mounted within said lower section for movement between a retracted transport position and an extended operating position, lifting means pivotally mounted on said frame and slidably engageable with at least one of said sections, power means having mechanical connection with said lifting means and with said sections for raising said sections to operating position, first power actuated latch mechanisms mounted on said lower section and engageable with said lifting means for positively locking said lower section in raised position, second power actuated latch mechanisms mounted on said upper section and engageable with said lower section to positively lock said upper section in extended position, and means for augmenting the action of the lifting means including a compression member pivotally mounted at its inner end, upon the frame adjacent the pivotal axis of the lifting means, for radial movement about said axis in advance of said lifting means during the lifting operation, a tension member connecting the outer end of said compression member with a portion of the lifting means adjacent the point of slidable engagement of the lifting means and the frame and means for applying tension to the tension member at its point of connection with the compression member.

7. A portable well rig comprising a frame, a lower derrick section pivotally mounted on said frame for movement between transport position and raised operating position tilted beyond the vertical, at least one upper derrick section slidably mounted relative to said lower section for movement between a retracted transport position and an extended operating position, lifting means pivotally mounted on said frame and slidably engageable with at least one of said sections, power means having mechanical connection with said lifting means and with said sections for raising said sections to operating position, first latch means for positively locking said lower section in raised position, second latch means for positively locking said upper section in extended position, and means for augmenting the action of the lifting means including a compression member pivotally mounted at its inner end, upon the frame adjacent the pivotal axis of the lifting means, for radial movement about said axis in advance of said lifting means during the lifting operation, a tension member connecting the outer end of said compression member with a portion of the lifting means adjacent the point of slidable engagement of the lifting means and the frame and means for applying tension to the tension member at its point of connection with the compression member.

References Cited in the file of this patent

UNITED STATES PATENTS

| | | |
|---|---|---|
| 524,476 | Austin | Aug. 14, 1894 |
| 701,975 | Weaver | June 10, 1902 |
| 1,743,123 | Elwood | Jan. 14, 1930 |
| 2,267,705 | Athy | Dec. 30, 1941 |
| 2,354,922 | McEwen et al. | Aug. 1, 1944 |
| 2,565,777 | Moon | Aug. 28, 1951 |
| 2,583,958 | Moon | Jan. 29, 1952 |
| 2,617,500 | Cardwell et al. | Nov. 11, 1952 |
| 2,656,023 | Woolslayer et al. | Oct. 20, 1953 |
| 2,725,959 | Plano et al. | Dec. 6, 1955 |
| 2,781,108 | Selberg et al. | Feb. 12, 1957 |
| 2,829,741 | Selberg et al. | Apr. 8, 1958 |